United States Patent
Rosensweig et al.

(10) Patent No.: US 9,929,918 B2
(45) Date of Patent: Mar. 27, 2018

(54) PROFILE-BASED SLA GUARANTEES UNDER WORKLOAD MIGRATION IN A DISTRIBUTED CLOUD

(71) Applicant: Alcatel-Lucent Israel Ltd., Petah Tikva (IL)

(72) Inventors: Elisha J. Rosensweig, Raanana (IL); Etti Shalev, Hod Hasharon (IL); Sharon Mendel-Brin, Tel Aviv (IL); Dmitri Krasnenko, Netanya (IL); Ifat Afek, Hod Hasharon (IL)

(73) Assignee: Alcatel Lucent, Boulogne-Billancourt (FR)

( * ) Notice: Subject to any disclaimer, the term of this patent is extended or adjusted under 35 U.S.C. 154(b) by 336 days.

(21) Appl. No.: 13/953,197

(22) Filed: Jul. 29, 2013

(65) Prior Publication Data

US 2015/0032894 A1    Jan. 29, 2015

(51) Int. Cl.
*H04L 12/24* (2006.01)
*G06F 9/50* (2006.01)
*H04L 12/26* (2006.01)

(52) U.S. Cl.
CPC ........ *H04L 41/5019* (2013.01); *G06F 9/5088* (2013.01); *H04L 41/5054* (2013.01);
(Continued)

(58) Field of Classification Search
CPC ............. H04L 41/5019; H04L 41/5054; H04L 41/5096; H04L 43/087; H04L 43/0852;
(Continued)

(56) References Cited

U.S. PATENT DOCUMENTS 7,464,163 B1 * 12/2008 Bantz .................... G06Q 10/06
                                                                  370/259
7,730,486 B2    6/2010 Herington
(Continued)

FOREIGN PATENT DOCUMENTS

JP    2009134687 A    6/2009
WO    20138/019185    2/2013
WO    WO 2013019185 A1 *    2/2013    ......... G06F 9/45533

OTHER PUBLICATIONS

OpenStack Computer—Administration Manual, Essex (Jan. 2012) (Sep. 17, 2012), available at: http://docs.openstack.org., pp. 190-198.

(Continued)

*Primary Examiner* — Dustin Nguyen
*Assistant Examiner* — Javier O Guzman
(74) *Attorney, Agent, or Firm* — Kramer & Amado, P.C.

(57) ABSTRACT

Various exemplary embodiments relate to a method and related network node including one or more of the following: receiving performance metrics from at least one device within the cloud network; analyzing the performance metrics to generate at least one application requirement, wherein the at least one application requirement indicates a recent performance associated with a resource provisioned for a customer, wherein the resource is supported by a first device within the cloud network; identifying a second device within the cloud network to support the resource based on the at least one application requirement; and migrating the resource from the first device to the second device.

14 Claims, 4 Drawing Sheets

(52) U.S. Cl.
CPC .... *G06F 2209/501* (2013.01); *H04L 41/5096* (2013.01); *H04L 43/087* (2013.01); *H04L 43/0817* (2013.01); *H04L 43/0852* (2013.01); *H04L 43/10* (2013.01)

(58) Field of Classification Search
CPC . H04L 43/0817; H04L 43/10; G06F 9/45558; G06F 9/5088
USPC .......................................................... 709/226
See application file for complete search history.

(56) References Cited

U.S. PATENT DOCUMENTS

| | | | | |
|---|---|---|---|---|
| 7,810,090 | B2* | 10/2010 | Gebhart | G06F 8/60 709/202 |
| 8,140,682 | B2* | 3/2012 | Murthy | G06F 9/5061 709/223 |
| 8,161,475 | B2 | 4/2012 | Araujo, Jr. | |
| 8,266,618 | B2* | 9/2012 | Iorio | G06F 9/4856 709/226 |
| 8,413,147 | B2 | 4/2013 | Shen et al. | |
| 8,601,471 | B2 | 12/2013 | Beaty | |
| 8,799,431 | B2* | 8/2014 | Pabari | G06F 9/5072 709/220 |
| 9,069,730 | B2 | 6/2015 | Talwar et al. | |
| 9,104,458 | B1* | 8/2015 | Brandwine | G06F 9/45558 |
| 9,558,026 | B2* | 1/2017 | Gilbert | G06F 9/45558 |
| 2006/0064486 | A1* | 3/2006 | Baron | H04L 41/0886 709/224 |
| 2009/0144393 | A1 | 6/2009 | Kudo | |
| 2010/0223385 | A1* | 9/2010 | Gulley | G06F 9/5027 709/226 |
| 2011/0231899 | A1* | 9/2011 | Pulier | G06F 9/45558 726/1 |
| 2011/0295999 | A1* | 12/2011 | Ferris | G06F 9/5072 709/224 |
| 2012/0089726 | A1* | 4/2012 | Doddavula | H04L 67/34 709/224 |
| 2012/0096134 | A1* | 4/2012 | Suit | G06F 9/5072 709/221 |
| 2012/0131173 | A1* | 5/2012 | Ferris | G06F 9/5066 709/224 |
| 2012/0173708 | A1* | 7/2012 | Bartfai-Walcott | G06F 9/5072 709/224 |
| 2012/0311106 | A1* | 12/2012 | Morgan | H04L 41/0806 709/220 |
| 2012/0324443 | A1* | 12/2012 | Low | G06F 9/5088 718/1 |
| 2013/0007734 | A1* | 1/2013 | McCloy | G06F 9/45558 718/1 |
| 2013/0238786 | A1* | 9/2013 | Khesin | H04L 67/34 709/224 |
| 2013/0238804 | A1* | 9/2013 | Tanino | G06F 9/5088 709/226 |
| 2013/0282919 | A1* | 10/2013 | Richards, III | G06F 9/5072 709/238 |
| 2014/0215077 | A1* | 7/2014 | Soudan | H04L 47/11 709/226 |
| 2014/0359127 | A1* | 12/2014 | Linares | H04L 41/0816 709/226 |
| 2014/0359128 | A1* | 12/2014 | Bhattacharya | H04L 67/1097 709/226 |
| 2015/0229580 | A1* | 8/2015 | Ferris | G06F 9/5072 709/226 |
| 2015/0236977 | A1* | 8/2015 | Terayama | H04L 47/762 709/224 |
| 2015/0244640 | A1* | 8/2015 | Ponsford | H04L 47/70 709/226 |

OTHER PUBLICATIONS

"International Search Report for PCT/IB2014/001695 dated Jan. 23, 2015".
Choi, et al., "Autonomous Learning for Efficient Resource Utilization of Dynamic VM Migration", ICS '08—Proceedings of the ACM International Conference on Supercomputing; Island of Kos, Greece; Jun. 7-12, 2008, Jun. 7, 2008, 185-194.

* cited by examiner

| Node | Timestamp | CPU Usage | Memory Usage | Storage Utilization | Delay | Bandwidth |
|---|---|---|---|---|---|---|
| 1 | 1376603040 | 40% | 90% | 50% | 12ms | 10mbps/5mbps |
| 2 | 1376603100 | 95% | 50% | 15% | 25ms | 5mbps/1mbps |
| 3 | 1376603160 | 20% | 60% | 60% | 9ms | 8mbps/4mbps |
| ... | ... | ... | ... | ... | ... | ... |

FIG. 5

| Customer Application | Nodes Used | Resources | Inter-Resource Latency |
|---|---|---|---|
| A | 1 | VM1 | 5ms |
| A | 1 | DB1 | 17ms |
| A | 2 | VM2 | 30ms |
| B | 2 | VM3 | 12ms |
| B | 2 | VM4 | 18ms |
| B | 3 | VM5 | 13ms |
| B | 3 | VM6 | 20ms |
| ... | ... | ... | ... |

FIG. 6

| Customer | Rule |
|---|---|
| X | VM1 at Node with 40% CPU Utilization |
| X | VM1 and DB1 average latency of 2ms |
| X | ... |
| Y | VM3, VM4 at Node with 5mbps bandwidth |
| Y | ... |
| ... | ... |

FIG. 7

PROFILE-BASED SLA GUARANTEES UNDER WORKLOAD MIGRATION IN A DISTRIBUTED CLOUD

TECHNICAL FIELD

Various exemplary embodiments disclosed herein relate generally to cloud computing.

BACKGROUND

Many cloud operators currently host cloud services using a few large data centers, providing a relatively centralized operation. In such systems, a requestor may request the use of one or more resources from a cloud controller which may, in turn, allocate the requested resources from the data center for use by the requestor. This centralized operation, however, may not be well suited for hosting various types of applications, such as those with strict delay or reliability requirements.

Distributed data center architectures, on the other hand, provide a larger number of smaller data centers that may be geographically distributed. The data centers may remain under the control of one or more cloud controllers through a network such as the Internet or carrier networks. Under such a distributed system, the effects of network propagation delay may be reduced by providing cloud applications that are closer to various customers in terms of geographic or network distance than a centralized cloud may be able to provide.

In both types of cloud networks, it is occasionally advantageous to rearrange resources provisioned for a customer among the available devices. For example, changing network conditions may render a device unsuitable for continued support of a customer resource due to degraded connectivity, heightened customer application reliance on inter-resource communication may lead to a desire to move such resources geographically close to each other, or increased load one device may lead to a desire to move resources to less heavily-loaded devices.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a cloud controller for migrating resources within a cloud network, the method including: receiving performance metrics from at least one device within the cloud network; analyzing the performance metrics to generate at least one application requirement, wherein the at least one application requirement indicates a recent performance associated with a resource provisioned for a customer, wherein the resource is supported by a first device within the cloud network; identifying a second device within the cloud network to support the resource based on the at least one application requirement; and migrating the resource from the first device to the second device.

Various embodiments described herein relate to a cloud controller for migrating resources within a cloud network, the cloud controller including: a network interface; a memory; and a processor in communication with the memory, the processor being configured to: receive, via the network interface, performance metrics from at least one device within the cloud network, analyze the performance metrics to generate at least one application requirement, wherein the at least one application requirement indicates a recent performance associated with a resource provisioned for a customer, wherein the resource is supported by a first device within the cloud network, identify a second device within the cloud network to support the resource based on the at least one application requirement, and migrate the resource from the first device to the second device.

Various embodiments described herein relate to a non-transitory machine-readable storage medium encoded with instructions for execution by a cloud controller for migrating resources within a cloud network, the medium including: instructions for receiving performance metrics from at least one device within the cloud network; instructions for analyzing the performance metrics to generate at least one application requirement, wherein the at least one application requirement indicates a recent performance associated with a resource provisioned for a customer, wherein the resource is supported by a first device within the cloud network; instructions for identifying a second device within the cloud network to support the resource based on the at least one application requirement; and instructions for migrating the resource from the first device to the second device.

Various embodiments are described wherein identifying a second device within the cloud network to support the resource based on the at least one application requirement includes determining that migration of the resource to the second device will preserve the at least one application requirement.

Various embodiments are described wherein identifying a second device within the cloud network to support the resource based on the at least one application requirement includes determining that migration of the resource to the second device will violate the at least one application requirement by less than a predetermined amount.

Various embodiments are described wherein identifying a second device within the cloud network to support the resource is further based on an explicit service level agreement (SLA) associated with the customer.

Various embodiments are described wherein the at least one application requirement includes a device-level performance metric.

Various embodiments are described wherein the at least one application requirement includes an application-level performance metric.

Various embodiments are described wherein identifying a second device within the cloud network to support the resource includes computing a new arrangement of a set of resources among multiple devices belonging to the cloud.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

While migration of customer resources within a cloud network may be advantageous in many contexts, it is also desirable to preserve the customer's experience after such migration. As used herein, the term "customer" will be understood to refer to a user that interfaces with a cloud provider to receive infrastructure as a service (IaaS), platform as a service (PaaS), or software as a service (SaaS) from the cloud network. For example, the cloud provider and customer may have entered into a service level agreement (SLA) defining minimum performance requirements that will be provided to the customer's applications. For example, an SLA may specify that a certain amount of computing power or a certain maximum latency between resources. Upon migration, of resources within the cloud network, the cloud provider may attempt to preserve the SLA by choosing devices to support the resources that meet the SLA's provisions.

Further, in some cases it may be desirable to, in addition to preserving the SLA which may define minimum acceptable performance, preserve a customer experience to which a customer has become accustomed. For example, while an SLA may provide that 20 ms of inter-resource communication delay is acceptable, the customer may average, and therefore expect, 10 ms of inter-resource communication delay. As such, it may be desirable to preserve the customer experience, above and beyond the provisions of the SLA, upon migration.

Referring now to the drawings, in which like numerals refer to like components or steps, there are disclosed broad aspects of various exemplary embodiments.

Figure 1:
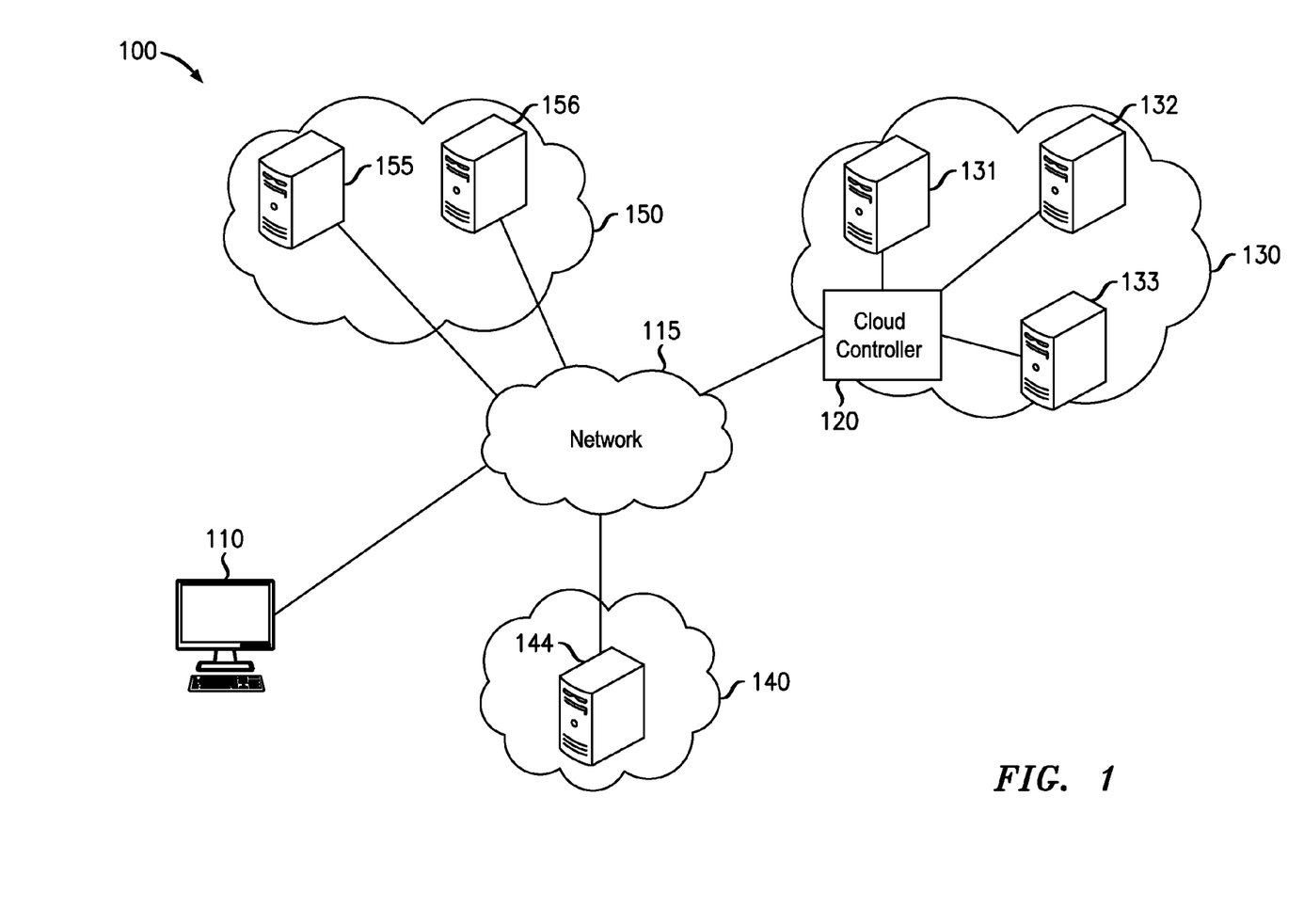
FIG. 1 illustrates an exemplary network for providing cloud resources.

FIG. 1 illustrates an exemplary cloud architecture 100 for providing cloud resources. The cloud architecture 100 may implement a networked cloud architecture and may include a client device 110, a network 115, a cloud controller 120, and data centers 130, 140, 150.

The client device 110 may be any device configured to utilize one or more cloud resources. In various embodiments, the client device 110 may be a desktop computer, laptop, tablet, mobile device, server, or blade. The client device 110 may communicate with other devices, such as the cloud controller 120, via the network 115. The client device 110 may transmit a request for one or more cloud resources to the cloud controller 120. For example, the client device 110 may request the use of one or more virtual machines (VMs), groups of VMs, storage devices, memory, or other resources within the cloud network 100. Additional types of cloud resources will be apparent. The client device 110 may represent a device of a customer that requests the deployment of a distributed cloud application from the cloud controller 120 or the client device 110 may represent a customer of such a customer that requests the use of one or more components of such a distributed cloud application by directly communicating with such resources supported by the various cloud devices 131, 132, 133, 144, 155, 166. It will be apparent that multiple additional client devices (not shown) may be in communication with the network 115 and such additional client devices may belong to additional customers.

The network 115 may be any network of devices or transmission media capable of enabling communication between the various devices of the exemplary cloud architecture 100. For example, the network 115 may include numerous devices configured to exchange and route data packets toward various destinations. In various embodiments, the network 115 may include the Internet or one or more carrier networks.

The cloud controller 120 may be a device configured to control the operations of a networked cloud. The cloud controller 120 may include various hardware such as a storage device, memory, or one or more processors, as will be described in greater detail below with respect to FIG. 3. As used herein, the term "processor" will be understood to encompass a variety of devices such as microprocessors, field-programmable gate arrays (FPGAs), application-specific integrated circuits (ASICs), and other similar processing devices. In various embodiments, the cloud controller 120 may include, for example, a server, a blade, a personal computer, a laptop, a tablet, or a mobile device. In some such embodiments, the cloud controller 120 may be a virtual machine that utilizes cloud resources such as, for example, the hardware resources provided by cloud devices 131, 132, 133. The cloud controller 120 may reside at a data center, such as data center 130, or may reside elsewhere. The cloud controller 120 may perform various cloud management functions, including management of cloud resource allocation. As such, the cloud controller 120 may receive requests for the establishment of cloud applications from client devices such as the client device 110. Upon receiving such requests, the cloud controller 120 may allocate requested resources from one or more of the cloud devices 131, 132, 133, 144, 155, 156, for use by client devices. In various embodiments, the exemplary cloud architecture 100 may include multiple cloud controllers (not shown). Various techniques for coordinating the operation of multiple cloud controllers will be apparent.

The data centers 130, 140, 150 may each be locations supporting one or more devices that provide cloud resources. For example, data center 130 may host cloud devices 131, 132, 133; data center 140 may host cloud device 144; and data center 150 may host cloud devices 155, 156. The data centers 130, 140, 150 may be geographically distributed or may be situated at different network distances from the client device 110. For example, the client device 110 may be located in Washington, D.C., data center 140 may be located in Chicago, data center 150 may be located in Paris, and data center 130 may be located in Tokyo. According to this example, the client device 110 may experience less network latency when communicating with data center 140 than when communicating with data center 130. It will be apparent that the cloud architecture 100 may include numerous additional data centers (not shown) and that each data center may include any number of cloud devices.

Each of cloud devices 131, 132, 133, 144, 155, 156 may be a device configured to provide cloud resources for use by client devices. In various embodiments, each of the cloud devices 131, 132, 133, 144, 155, 156 may be a desktop computer, laptop, tablet, mobile device, server, or blade. As such, the cloud devices 131, 132, 133, 144, 155, 156 may include various hardware such as, for example, storage devices, memory, or one or more processors. The cloud devices 131, 132, 133, 144, 155, 156 may be configured to provide processing, storage, memory, VMs, or groups of VMs for use by client devices such as the client device 110.

In various embodiments, such as the embodiment illustrated in FIG. 1, the cloud controller 120 may include or interface with an application manager (not shown) to deploy and subsequently scale a cloud application with demand. The application manager may be, for example, a desktop computer, laptop, tablet, mobile device, server, or blade and may include a virtual machine.

Periodically, the cloud controller 120 may determine that it is advantageous to migrate resources provisioned for the client device 110 within the cloud network 100. For example, the cloud controller may determine that a device 155 supporting a VM associated with the client device 110 is overworked and that the VM should be relocated to another device 131, 132, 133, 144, 156. In deciding which device 131, 132, 133, 144, 156 should support the migrated VM, the cloud controller 120 may consider both an explicit SLA associated with the customer of a client device and a customer profile including application requirements reflecting the customer's recent performance experience. Using this information, the cloud controller may select a device 131, 132, 133, 144, 156 that is likely to preserve the explicit SLA and application requirements.

Figure 2:
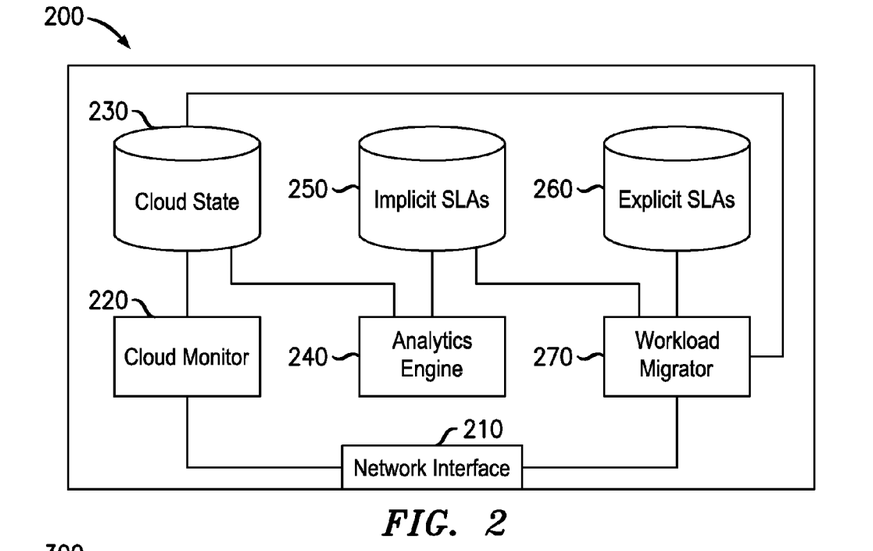
FIG. 2 illustrates a component diagram of an exemplary cloud controller.

FIG. 2 illustrates a component diagram of an exemplary cloud controller 200. The cloud controller 200 may correspond to the cloud controller 120 of the exemplary cloud network 100. The cloud controller 200 may include a network interface 210, cloud monitor 220, cloud state storage 230, analytics engine 240, implicit SLA storage 250, explicit SLA storage 260, and workload migrator 270.

The network interface 210 may be an interface including hardware or executable instructions encoded on a machine-readable storage medium configured to communicate with at least one other device. The network interface 210 may include one or more physical ports and may communicate according to one or more protocols such as, for example, TCP, IP, or Ethernet.

The cloud monitor 220 may include hardware or executable instructions on a machine-readable storage medium configured to poll various cloud devices for performance data. For example, the cloud monitor 220 may periodically generate a message requesting performance metrics and transmit the message via the network interface 210 to a cloud device. In response, the polled device may respond with performance metrics such as CPU utilization, memory usage, storage usage, network packet delay, packet delay variation (jitter), network bandwidth, or other device-level performance metrics. Additionally or alternatively, the device may report application-level performance metrics such as VM or other resource performances, inter-resource communication metrics, or cloud-specific information such as scheduled maintenance information. In various alternative embodiments, the cloud monitor 220 may not be configured to poll some devices and, instead, may receive performance updates pushed by the respective devices. Upon receiving performance metrics, the cloud monitor 220 may store the data in the cloud state storage 230 for later use.

The cloud state storage 230 may be a device that stores various performance metrics reported by the various devices belonging to the cloud network. The cloud state storage 230 may include a machine-readable storage medium such as read-only memory (ROM), random-access memory (RAM), magnetic disk storage media, optical storage media, flash-memory devices, and/or similar storage media. As will be explained below in connection with the examples of FIGS. 4-5, cloud state storage 230 may store device-level metrics or application-level metrics.

The analytics engine 240 may include hardware or executable instructions on a machine-readable storage medium configured to analyze the performance metrics stored in the cloud state storage 230 to model a recent customer experience in the form of a profile or "implicit SLA." For example, the analytics engine may retrieve, for a current customer under analysis, performance metrics associated with resources provisioned to that customer and the devices supporting those resources. Then, the analytics engine may use this data to form a summary of the performance experienced by the customer. Various additional or alternative methods of performing analytics on cloud performance data in relation to a customer experience will be apparent. After generating an implicit SLA, including one or more application requirements indicating performance metrics recently experienced by the customer, the analytics engine 240 may store the implicit SLA in the implicit SLA storage 250.

The implicit SLA storage 250 may be a device that stores implicit SLAs generated by the analytics engine 240. The implicit SLA storage 250 may include a machine-readable storage medium such as read-only memory (ROM), random-access memory (RAM), magnetic disk storage media, optical storage media, flash-memory devices, and/or similar storage media. As will be explained below in connection with the examples of FIG. 6, the implicit SLA storage 250 may store device-level metrics or application-level metrics to serve as application requirements for a particular customer.

The explicit SLA storage 260 may be a device that stores explicit SLAs entered into by the cloud provider and customer. The explicit SLA storage 260 may include a machine-readable storage medium such as read-only memory (ROM), random-access memory (RAM), magnetic disk storage media, optical storage media, flash-memory devices, and/or similar storage media. The explicit SLA storage 260 may store device-level metrics or application-level metrics to serve as the explicit SLA for a particular customer.

The workload migrator 270 may include hardware or executable instructions on a machine-readable storage medium configured to determine whether resource migration is appropriate for an application, select a new device to support the migrated resource, and effect such migration via the network interface 210. Various methods for determining that a resource should be migrated will be apparent. In selecting the new device, the workload migrator 270 may be configured to consider one or more implicit SLAs or explicit SLAs. For example, the workload migrator 270 may retrieve an application requirement from an implicit SLA stored in the implicit SLA storage 250 for the customer to which the resource-to-be-migrated is provisioned. Then, the workload migrator 270 may select a device that will likely be able to meet the application requirement. For example, where the application requirement specifies that general packet delay experienced by the resource is 10 ms, the workload migrator 270 may select a device known to have reported a general packet delay of 10 ms or better, as reflected by the data stored in the cloud state storage. In this manner, the workload migratory 270 may take into account multiple application requirements stored in the implicit SLAs storage 250 or provisions of explicit SLAs stored in the explicit SLA storage 260.

In various alternative embodiments, the workload migrator 270 may configured to allow variance from an application requirement by a predetermined amount, such as a literal difference value or a percentage variance. For example, where an application requirement states a packet delay of 10 ms and the workload migratory is configured to allow up to 100% variance for the customer or resource type, the workload migrator 270 may select a device experiencing a general packet delay of 20 ms.

After selecting a new device, the workload migrator 270 may effect actual migration of the resource. For example, the workload migrator 270 may transmit a message to the current device supporting the resource indicating that the resource should be suspended or that an image of the resource should be transmitted to the new device or the cloud controller 200. Additionally or alternatively, the workload migrator 270 may transmit a message to the new device indicating that the new device should begin supporting the migrated resource. In various embodiments, this message may include or otherwise identify an image of the resource to be supported. Various additional operations and methods for performing resource migration will be apparent.

Figure 3:
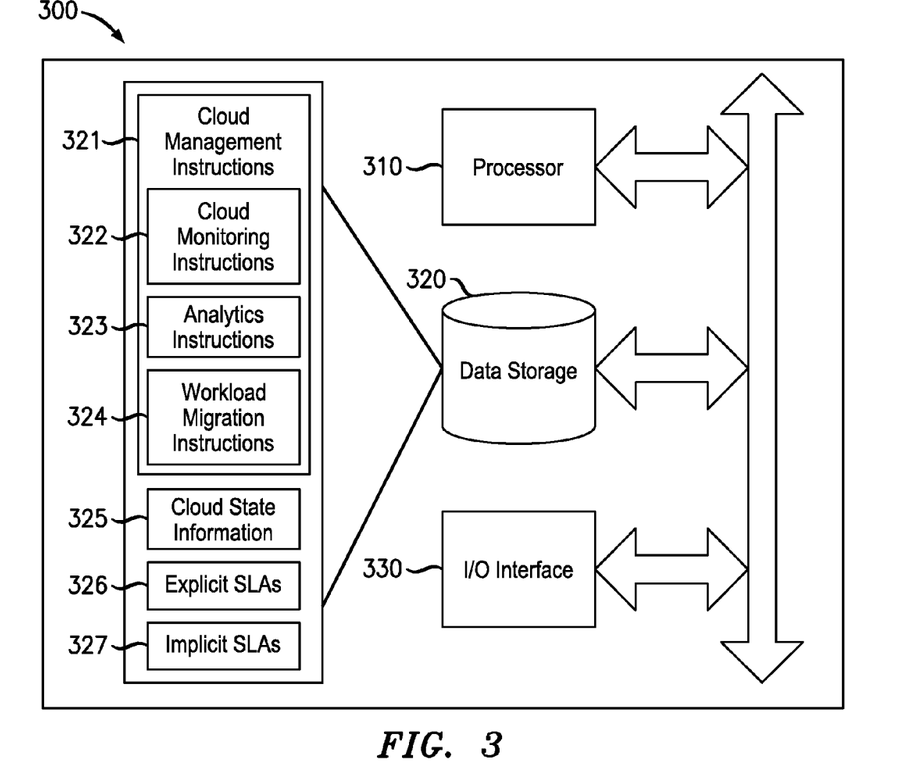
FIG. 3 illustrates a hardware diagram of an exemplary cloud controller.

FIG. 3 illustrates a hardware diagram of an exemplary cloud controller 300. The exemplary cloud controller 300 may correspond to the exemplary cloud control 200 of FIG. 2 or the exemplary cloud controller 120 of FIG. 1. The cloud controller 300 may include a processor 310, a data storage 320, and an input/output (I/O) interface 330.

The processor 310 may control the operation of the cloud controller 300 and cooperate with the data storage 320 and the I/O interface 330, via a system bus. As used herein, the term "processor" will be understood to encompass a variety of devices such as microprocessors, field-programmable gate arrays (FPGAs), application-specific integrated circuits (ASICs), and other similar processing devices.

The data storage 320 may store program data such as various programs useful in managing resources in a cloud. For example, the data storage 320 may store cloud management instructions 321 for performing various methods known to those of skill in the art for managing resources in a cloud network. For example, the cloud management instructions 321 may include instructions for provisioning and releasing resources for customers within the cloud. The cloud management instructions 321 may include further instructions or methods useful in cooperating with one or more application managers and coordinating the operations of various data centers, hypervisors, or virtual machines.

The cloud management instructions 321 may also include instructions for preserving implicit SLAs during workload migration, as will be discussed in greater detail below with respect to FIG. 7. As shown, the cloud management instructions 321 may include cloud monitoring instructions 322 for performing functions associated with the cloud monitor 220, analytics instructions 323 for performing functions associated with the analytics engine 240, and workload migration instructions 324 for performing functions associated with the workload migrator 270.

The data storage 320 may also store various data for use in execution of the cloud management instructions 321. For example, the data storage 320 may store cloud state information 325 reported by other devices within the cloud network, explicit SLAs 326 agreed to between the cloud provider and customer, and implicit SLAs 327 generated by the cloud controller 300 based on the cloud state information 325 or other data. Various exemplary data arrangements for storing this data will be described in greater detail below with respect to FIGS. 4-6.

The I/O interface 330 may cooperate with the processor 310 to support communications over one or more communication channels. For example, the I/O interface 330 may include a user interface, such as a keyboard and monitor, and/or a network interface, such as one or more Ethernet ports.

In some embodiments, the processor 310 may include resources such as processors/CPU cores, the I/O interface 330 may include any suitable network interfaces, or the data storage 320 may include memory or storage devices. Moreover the cloud controller 300 may be any suitable physical hardware configuration such as: one or more servers or blades consisting of components such as processor, memory, network interfaces or storage devices. In some of these embodiments, the cloud controller 300 may include cloud network resources that are remote from each other.

In some embodiments, the cloud controller 300 may include one or more virtual machines. In some of these embodiments, a virtual machine may include components from different physical machines or be geographically dispersed. For example, the data storage 320 and the processor 310 may reside in two different physical machines. In some embodiments, the cloud controller 300 may be a general purpose computer programmed to perform the methods described herein. When processor-executable programs are implemented on a processor 310, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

Figure 4:
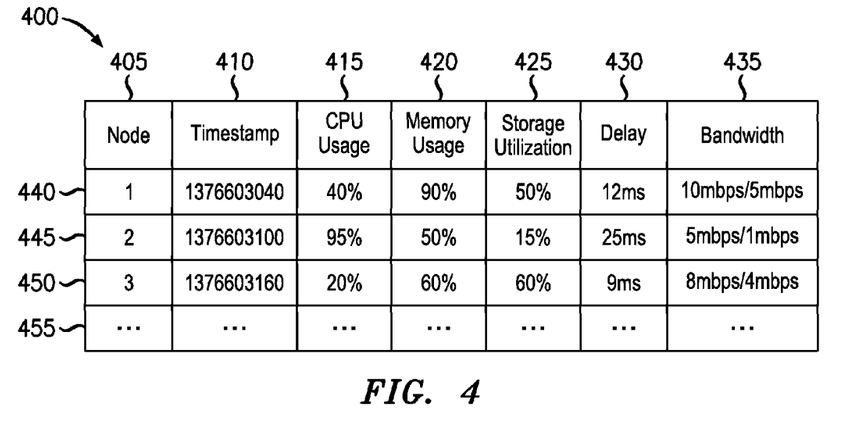
FIG. 4 illustrates an exemplary data arrangement for storing device-level performance metrics.

FIG. 4 illustrates an exemplary data arrangement 400 for storing device-level performance metrics. As used herein, the term "device-level" will be understood to relate to the experience of a hardware device as a whole, without regard to the specific applications which the device supports. The data arrangement 400 may reflect contents of the cloud state storage 230 of the exemplary cloud controller 200 and may represent reported cloud state information. It will be understood that the exemplary data arrangement 400 may be an abstraction and that data may be stored in a variety of manners such as, for example, arrays, lists, trees, or other data structures known to those of skill in the art. The data arrangement 400 may include a node field 405, a timestamp field 410, a CPU usage field 415, a memory usage field 420, a storage utilization field 425, a delay field 430, and a bandwidth field 435. Various alternative or additional performance metrics for tracking a device performance will be apparent.

The node field 405 may store an identification (e.g., an identifier or an address) of a hardware device to which a record applies. The timestamp field 410 may store a timestamp indicating the time at which the metrics carried in a specific record were reported. For example, in some embodiments, a cloud controller may maintain a history of performance metrics for each node and may utilize a time stamp to differentiate between reports. In other embodiments, the cloud controller may not maintain a history and instead may, for example, only maintain the most recent report or may maintain an "average" of recently reported performance metrics. In such embodiments, the timestamp field 410 may not be present.

The remaining fields 415-435 may indicate various reported performance metrics. The CPU usage field 415, memory usage field 420, and storage utilization field 425 may store performance metrics relating to a current state of the device or hardware components thereof. The delay field 430 and bandwidth field 435 may store performance metrics relating to the device's current experience utilizing external devices or services, such as measurements of network connection quality. It will be understood that various fields may describe a relationship between multiple nodes. For example, a delay field 415 may alternatively be structure to store a delay measurement between a node and each other node in an application, rather than an average among all such nodes. Various additional performance metrics useful in analyzing a current cloud state and customer experience will be apparent such as, for example, page file usage or network jitter.

As an example, record 440 indicates that, at time "1376603040," node "1" reported that its CPU was 40% utilized, its memory was 90% full, and its storage was 50% full. Further, the record may indicate that the network connection for the device has averaged a packet delay of 12 ms and a bandwidth of 10 mbps downstream and 5 mbps upstream. The meanings of exemplary records 445 and 450 will be apparent in view of the foregoing. The data arrangement 400 may include numerous additional records 455.

Figure 5:
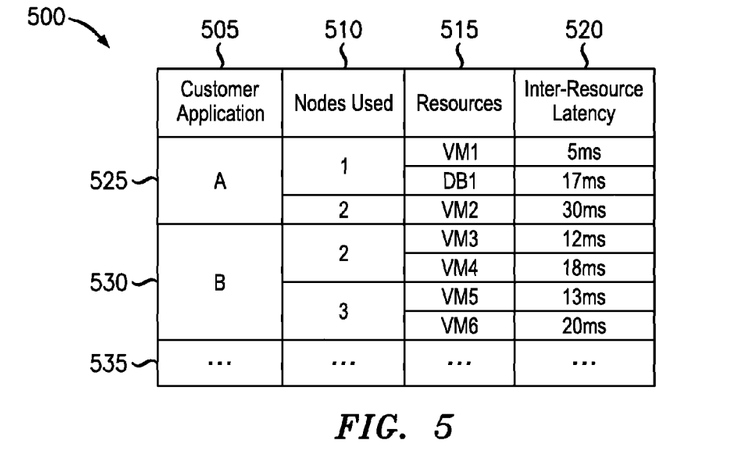
FIG. 5 illustrates an exemplary data arrangement for storing application-level performance metrics.

FIG. 5 illustrates an exemplary data arrangement 500 for storing application-level performance metrics. As used herein, the term "application-level" will be understood to relate to the experience of a resource utilizing one or more hardware devices of the cloud network. As will be understood a resource may cooperate with other resources to implement an application for a customer. The data arrangement 500 may reflect contents of the cloud state storage 230 of the exemplary cloud controller 200 and may represent reported cloud state information. It will be understood that the exemplary data arrangement 500 may be an abstraction and that data may be stored in a variety of manners such as, for example, arrays, lists, trees, or other data structures known to those of skill in the art. The data arrangement 500 may include a customer application field 505, a nodes used field 510, a resources field 515, and an inter-resource latency field 520. Various alternative or additional performance metrics for tracking application performance will be apparent.

The customer application field 505 may include an indication of a customer application (e.g., a customer identifier or an application identifier) to which a record applies. The nodes used field 510 may include an identification of one or more physical devices that support resources associated with the customer application. The resources field 515 may include an indication of one or more resources provisioned on each node for the customer application. The inter-resource latency field 520 may include a performance metric for each such resource. As shown, the inter-resource latency field 520 may indicate an average latency experiences by the resource across communications with other resources of the application.

It will be apparent that various other arrangements and fields may be used. For example, the data arrangement 500 may utilize a timestamp field, may not include a nodes used field 510, may not include metrics for each resource and instead may include a single metric across all resources, or may include a resource metric for various pairs of resources. Various other modifications will be apparent.

As an example, record 525 may indicate that customer application "A" has reported the use of three resources. Resource "VM1" may utilize node "1" and may be experiencing an inter-resource latency of 5 ms. This may indicate that, an average of recent communications with DB1 or VM2 average to produce a latency of 5 ms. Resource "DB1" may utilize node "1" and may be experiencing an inter-resource latency of 17 ms. Resource "VM2" may utilize node "2" and may be experiencing an inter-resource latency of 30 ms. In view of the foregoing, the meaning of exemplary record 530 will be apparent. The data arrangement 500 may include numerous additional records 535.

Figure 6:
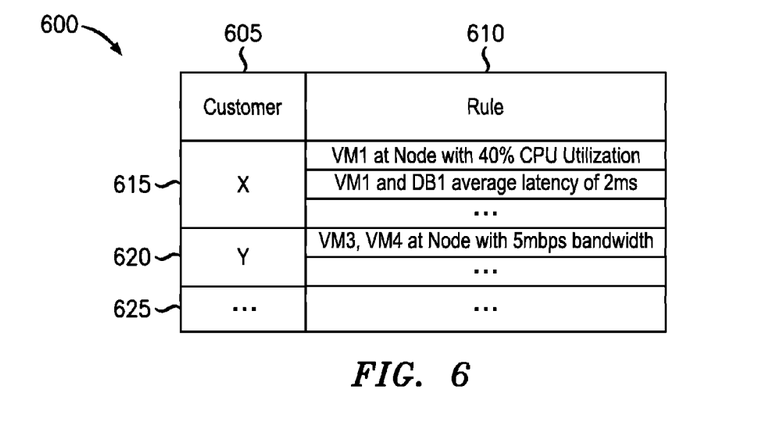
FIG. 6 illustrates an exemplary data arrangement for storing application requirements.

FIG. 6 illustrates an exemplary data arrangement 600 for storing application requirements. The data arrangement 600 may reflect contents of the implicit SLA storage 250 of the exemplary cloud controller 200 and may represent implicit SLAs generated using analytics. In some embodiments, the data arrangement 600 may reflect contents of the explicit SLA storage 260 and may represent explicit SLAs to which the customer and cloud provider have agreed. It will be understood that the exemplary data arrangement 600 may be an abstraction and that data may be stored in a variety of manners such as, for example, arrays, lists, trees, or other data structures known to those of skill in the art. The data arrangement 600 may include a customer field 605 and a rule field 610. Various alternative or additional fields for defining implicit or explicit SLAs will be apparent.

The customer field 605 may store an identification of a customer (e.g., a customer identifier or an application identifier) to which a record applies while the rule field 610 may store one or more rules for consideration during workload placement or migration.

As an example, record 615 may identify multiple rules for a customer "X." A first rule may indicate that a resource "VM1" should be or has recently been located at a node reporting 40% CPU utilization. A second rule may indicate that two resources "VM1" and "DB1" should experience or have recently experienced an average latency of 2 ms therebetween. The record 615 may include multiple additional rules. In view of the foregoing, the meaning of exemplary record 620 will be apparent. The data arrangement 600 may include numerous additional records 625.

Figure 7:
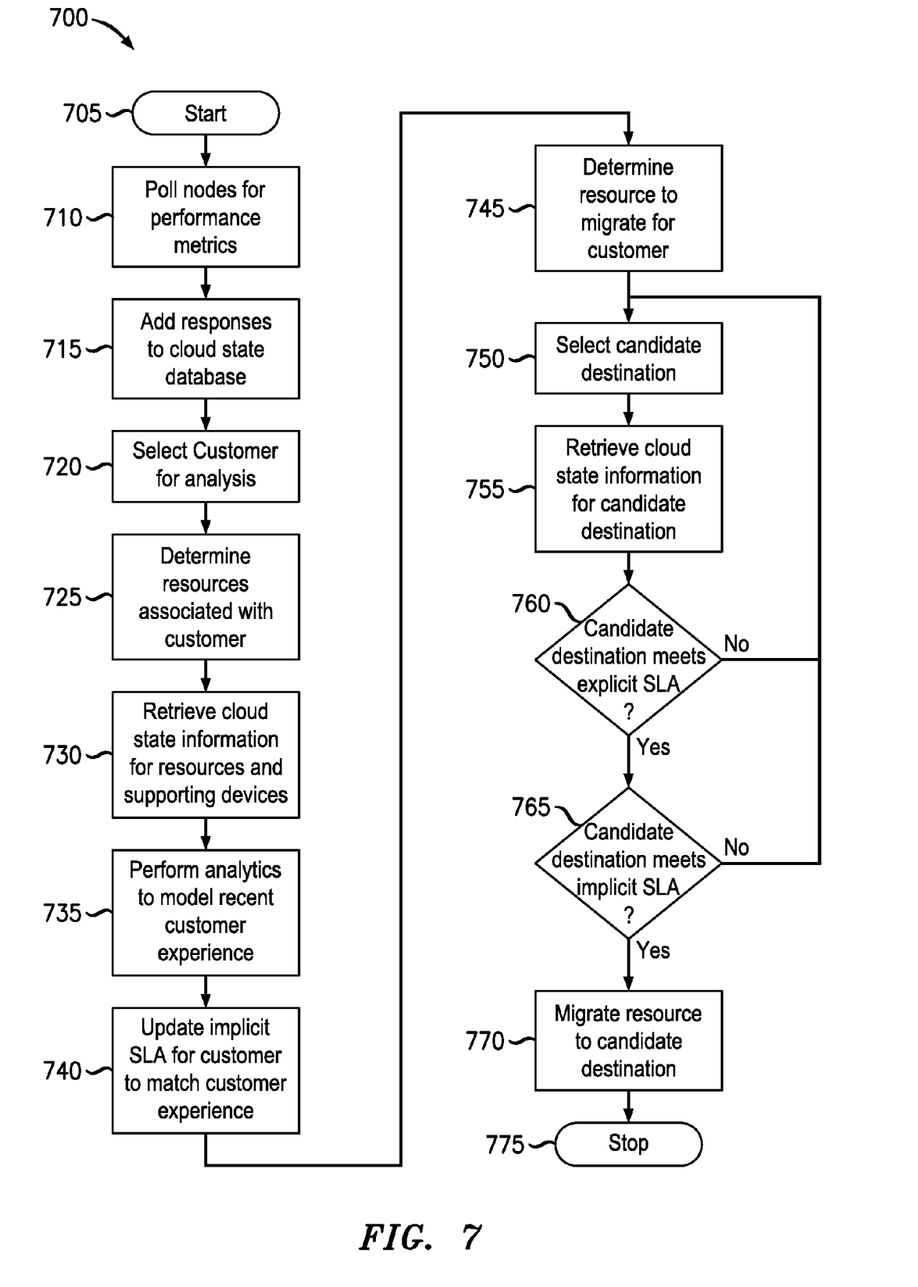
FIG. 7 illustrates an exemplary method for migrating customer resources within a cloud network.

FIG. 7 illustrates an exemplary method 700 for migrating customer resources within a cloud network. The method 700 may be performed by the components of a cloud controller 200 such as, for example, a cloud monitor 220, an analytics engine 240, or a workload migrator 270. It will be understood that various modifications may be made to the method 700 while still achieving the goals of the methods described herein. For example, the method 700 may be implemented as multiple independent processes such as, for example, a process that periodically polls for cloud state information, a process that periodically generates implicit SLAs, and a process that periodically migrates resources within the cloud. Further modification will be apparent.

The method 700 may begin in step 705 and proceed to step 710 where the cloud controller 200 may poll one or more nodes for performance metrics. For example, the cloud controller 200 may generate and transmit request messages to the appropriate devices. After receiving a response, the cloud controller 200 may store the reported performance metrics for later analysis. In some embodiments, the cloud controller 200 may simply store the data as reported, while in other embodiments the cloud controller 200 may first process the received data such as, for example, averaging the performance data with previously-reported performance data prior to storage.

Next the cloud controller 200 may begin the process of generating an implicit SLA by, in step 720, selecting a customer to be analyzed. For example, in some embodiments, the cloud controller 200 may periodically iterate through a group of customers and step 720 may comprise selecting a next customer in such group. Then, in step 725, the cloud controller 200 may determine which resources or devices are associated with the customer or an application belonging thereto. For example, the cloud controller may retrieve a record associated with the customer that defines or otherwise describes a current application deployed for the customer. After identifying the resources or devices associated with the customer under analysis, the cloud controller 200 may, in step 730, retrieve cloud state information for the resources or devices. Such cloud state information may include cloud state information retrieved and stored in steps 710 and 715.

Using the retrieved cloud state information, the cloud controller 200 may, in step 735, perform analytics to model the customer's recent experiences. The cloud controller 200 may perform such analytics according to any method known to those of skill in the art. For example, the cloud controller may consider information such as metrics related to cloud usage (e.g., bandwidth consumption, CPU usage, memory usage, storage usage, inter-resource delay, data center load, etc.), peripheral information that indirectly impacts behavior (e.g., time of day, month, year, upcoming holidays, predicted natural phenomena such as storms or earthquakes), or customer service profile information (e.g., number of users, customer-provided predictions of values such as load or usership). Using this information, the cloud controller 200 may use various models to gauge the user experience such as, for example, average or worst case behavior with regard to one or more metrics, or date/time-specific average or worst case behavior. One method of tracking behavior based on date or time may include using a Bayesian Network, as will be understood.

After generating such model, the cloud controller 200 may, in step 740, update an implicit SLA associated with the customer under analysis. Such step may include creating a new implicit SLA in cases where an implicit SLA has not been previously generated for the customer. The update to the SLA may take into account the model of recent customer experience as well as any rules previously generated for the customer and carried by the previous version of the implicit SLA. For example, the new implicit SLA may retain one or more previously created rules or may include rules that are modified to only deviate from previous rules by a predetermined amount. Various other modifications will be apparent.

Sometime after updating the implicit SLA, the cloud controller 745 may begin a process or workload migration for a customer. At step 745, the cloud controller 745 may determine that one or more resources associated with the customer should be migrated. This determination may be made according to any methods known to those of skill in the art and may be based on factors such as network state, workload of cloud devices, projected SLA violation, or any other factors useful in determining that resources should be migrated.

Next, in step 750, the cloud controller 200 may select a cloud device as a candidate destination for supporting the migrated resource. This step may be performed according to any method known to those of skill in the art. For example, a placement engine using methods and concepts described in U.S. patent application Ser. No. 13/648,628, filed on Oct. 10, 2012, and Ser. No. 13/779,920, filed on Feb. 28, 2013, the entire disclosures of which are hereby incorporated by reference for all purposes. In some embodiments, step 750 may comprise computing a new resource-to-device mapping for multiple, or even all, resources belonging to the application under migration.

After selecting the candidate destination, the cloud controller 200 may begin to evaluate the candidate destination against any appropriate SLAs by, in step 755, retrieving any cloud state information associated with the candidate device and any other relevant devices. In steps 760 and 765, the cloud controller 200 may determine whether the proposed migration will violate any explicit or implicit SLAs, respectively. For example, the cloud controller may determine whether a performance metric of the candidate device stored in the cloud state information violates any application requirements of an SLA. As another example, the cloud controller may utilize previously-reported network performance for the candidate device or inter-process latency reported for other resources associated with the candidate device to estimate whether an inter-process latency application requirement is likely to be met after migration. In some embodiments, the cloud controller may be configured to accept application requirement violations that deviate by less than a predetermined amount, such as a literal value or percentage. As another alternative, the implicit SLA may be used to provide a gradual degradation of quality of service by allowing the implicit SLA to degrade over time to meet the explicit SLA. Yet another feature may provide tailored service offerings. For example, if there is a significant difference between the explicit SLA and the implicit SLA, the cloud controller 200 or other entity may send a message to the customer identifying the recent performance and offering a service upgrade to bring the explicit SLA closer to the implicit SLA. Various other modifications will be apparent.

If the candidate destination is found to be unacceptable in either step 760 or 765, the method 700 may loop back to step 750 where the cloud controller may attempt to select a different candidate destination or application device mapping for evaluation. Otherwise, the method 700 may proceed to step 770 where the cloud controller may effect the selected migration by, for example, sending one or more messages to cloud devices instructing the cloud devices to migrate the resource to the candidate device. The method 700 may then proceed to end in step 775.

It will be understood that, in various embodiments, it may not always be possible or practicable to select a candidate destination that preserves explicit or implicit SLAs. In such cases, the cloud controller may select a destination that violates on or more SLAs. Various methods for effecting such selection and methods for mitigating impact when SLAs are violated will be apparent.

It will be apparent that various alternative methods for selecting appropriate devices for supporting migrated servers may be utilized. For example, the step of selecting a candidate destination may itself take into account any explicit or implicit SLAs and steps 760, 765 may not be performed. Various other modifications and methods for migrating workload while preserving explicit and implicit SLAs will be apparent.

According to the foregoing, various embodiments enable the migration of resources while preserving customer experience above and beyond any explicit SLAs agreed to by the cloud provider and customer. For example, by modeling a recent customer experience, a cloud controller may generate an "implicit SLA" that may be used in a manner similar to an explicit SLA during workload migration to avoid negative impact to the customer's experience. Various other benefits will be apparent in view of the foregoing.

It should be apparent from the foregoing description that various exemplary embodiments of the invention may be implemented by hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a cloud controller for migrating resources within a cloud network, the method comprising:
   receiving performance metrics from at least one device within the cloud network;
   determining a resource to be migrated, wherein the resource is supported by a first device within the cloud network;
   after determining the resource to be migrated, analyzing the performance metrics to generate at least one application requirement, wherein the at least one application requirement indicates a recent performance associated with the resource;
   identifying a second device within the cloud network to support the resource based on the at least one application requirement;
   determining that migration of the resource to the second device will preserve the at least one application requirement; and
   migrating the resource from the first device to the second device based upon the determination.

2. The method of claim 1, wherein identifying the second device within the cloud network to support the resource is further based on an explicit service level agreement (SLA) associated with a customer.

3. The method of claim 1, wherein the at least one application requirement comprises a device-level performance metric.

4. The method of claim 1, wherein the at least one application requirement comprises an application-level performance metric.

5. A cloud controller for migrating resources within a cloud network, the cloud controller comprising:
   a network interface;
   a memory; and
   a processor in communication with the memory, the processor being configured to: receive, via the network interface, performance metrics from at least one device within the cloud network, determine a resource to be migrated, wherein the resource is supported by a first device within the cloud network, after determining the resource to be migrated, analyze the performance metrics to generate at least one application requirement, the at least one application requirement indicates a recent performance associated with the resource, identify a second device within the cloud network to support the resource based on the at least one application requirement, determine that migration of the resource to the second device will preserve the at least one application requirement, and migrate the resource from the first device to the second device based upon the determination.

6. The cloud controller of claim 5, wherein, in identifying the second device within the cloud network to support the resource, the processor is configured to further base identification of the second device on an explicit service level agreement (SLA) associated with a customer.

7. The cloud controller of claim 5, wherein the at least one application requirement comprises a device-level performance metric.

8. The cloud controller of claim 5, wherein the at least one application requirement comprises an application-level performance metric.

9. A non-transitory machine-readable storage medium encoded with instructions for execution by a cloud controller for migrating resources within a cloud network, the medium comprising:
   instructions for receiving performance metrics from at least one device within the cloud network;
   instructions for determining a resource to be migrated, wherein the resource is supported by a first device within the cloud network;
   instructions for, after determining the resource to be migrated, analyzing the performance metrics to generate at least one application requirement, wherein the at least one application requirement indicates a recent performance associated with the resource;

instructions for identifying a second device within the cloud network to support the resource based on the at least one application requirement;

instructions for determining that migration of the resource to the second device will preserve the at least one application requirement; and instructions for migrating the resource from the first device to the second device based upon the determination.

10. The non-transitory machine-readable storage medium of claim 9, wherein the instructions for identifying the second device within the cloud network to support the resource are further based on an explicit service level agreement (SLA) associated with a customer.

11. The non-transitory machine-readable storage medium of claim 9, wherein the at least one application requirement comprises at least one of: a device-level performance metric, and an application-level performance metric.

12. The method of claim 1, wherein the cloud controller is configured to generate an implicit service level agreement (SLA) associated with a customer.

13. The method of claim 1, wherein the cloud controller is configured to store both explicit service level agreements (SLA) agreed to between a cloud provider and a customer and implicit SLAs generated by the cloud controller.

14. The method of claim 1, wherein the cloud controller is configured to offer a service upgrade to a customer that brings an explicit service level agreement (SLA) closer to an implicit SLA.

* * * * *